United States Patent
Aguera y Arcas et al.

(10) Patent No.: US 7,983,489 B2
(45) Date of Patent: Jul. 19, 2011

(54) USER INTERFACE FOR NAVIGATING THROUGH IMAGES

(75) Inventors: Blaise H. Aguera y Arcas, Seattle, WA (US); Jonathan R. Dughi, Seattle, WA (US); Bryan Ressler, Sammamish, WA (US); Ian A. Gilman, Seattle, WA (US); Alfred Astort, Seattle, WA (US); David M. Gedye, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 12/833,862

(22) Filed: Jul. 9, 2010

(65) Prior Publication Data

US 2010/0278435 A1 Nov. 4, 2010

Related U.S. Application Data

(62) Division of application No. 11/461,280, filed on Jul. 31, 2006, now Pat. No. 7,764,849.

(51) Int. Cl.
G06K 9/68 (2006.01)
G06K 9/46 (2006.01)
G06K 9/50 (2006.01)
G06K 9/54 (2006.01)
G06K 9/60 (2006.01)
H04N 1/00 (2006.01)

(52) U.S. Cl. ........ 382/220; 382/305; 382/201; 382/218; 382/219; 382/221; 382/222; 358/403; 358/404

(58) Field of Classification Search .................... None
See application file for complete search history.

(56) References Cited

U.S. PATENT DOCUMENTS

| 3,748,644 A | * | 7/1973 | Tisdale ........................ 382/201 |
| 4,891,750 A | * | 1/1990 | Pastor et al. ................. 382/197 |
| 4,953,227 A | | 8/1990 | Katsuma et al. |
| 4,996,994 A | | 3/1991 | Steinhauer et al. |
| 5,579,471 A | | 11/1996 | Barber et al. |
| 5,940,079 A | | 8/1999 | Morino et al. |
| 6,031,989 A | | 2/2000 | Cordell |
| 6,154,567 A | | 11/2000 | McGarry |

(Continued)

FOREIGN PATENT DOCUMENTS

JP 2002032761 1/2002

(Continued)

OTHER PUBLICATIONS

Snavely et al., "Photo Tourisn: Exploring Photo Collections in 3D," ACM Transactions on Graphics, 25(3), Aug. 2006.

(Continued)

*Primary Examiner* — Vikkram Bali
*Assistant Examiner* — Michelle Entezari
(74) *Attorney, Agent, or Firm* — Shook, Hardy & Bacon L.L.P.

(57) ABSTRACT

A system, method, and computer-readable media are presented for presenting similar images of a selected image in a user interface. One embodiment of the method can include identifying a selected first image and identifying a selected direction from the first image. Additionally, the method can include calculating a best neighbor metric for each of one or more other images to determine a best neighbor image in the selected direction. Furthermore, the method can include presenting the best neighbor image to a user in a user interface.

14 Claims, 10 Drawing Sheets

U.S. PATENT DOCUMENTS

| | | | |
|---|---|---|---|
| 6,272,501 B1 | 8/2001 | Baumann | |
| 6,281,903 B1 | 8/2001 | Martin et al. | |
| 6,317,139 B1 | 11/2001 | Williams | |
| 6,377,713 B1* | 4/2002 | Vuong | 382/299 |
| 6,453,064 B1* | 9/2002 | Aikawa et al. | 382/154 |
| 6,486,908 B1 | 11/2002 | Chen et al. | |
| 6,487,554 B2 | 11/2002 | Ganadpathy | |
| 6,522,782 B2 | 2/2003 | Pass | |
| 6,542,201 B1 | 4/2003 | Song et al. | |
| 6,556,196 B1 | 4/2003 | Blanz et al. | |
| 6,556,998 B1 | 4/2003 | Mukherjee et al. | |
| 6,591,011 B1* | 7/2003 | Nielsen | 382/218 |
| 6,611,268 B1 | 8/2003 | Szeliski et al. | |
| 6,628,824 B1 | 9/2003 | Belanger | |
| 6,629,097 B1 | 9/2003 | Keith | |
| 6,718,075 B1 | 4/2004 | Yamamoto | |
| 6,724,407 B1 | 4/2004 | Cheng | |
| 6,751,363 B1 | 6/2004 | Natsev | |
| 6,791,530 B2 | 9/2004 | Vernier | |
| 6,792,134 B2 | 9/2004 | Chen et al. | |
| 6,819,785 B1 | 11/2004 | Vining et al. | |
| 6,859,802 B1 | 2/2005 | Rui | |
| 6,963,666 B2* | 11/2005 | Abe | 382/209 |
| 7,031,555 B2 | 4/2006 | Troyanker | |
| 7,032,182 B2 | 4/2006 | Prabhu | |
| 7,065,248 B2 | 6/2006 | Lee et al. | |
| 7,324,115 B2 | 1/2008 | Fraser | |
| 7,350,236 B1 | 3/2008 | Silverboroook et al. | |
| 7,397,971 B2 | 7/2008 | Oka | |
| 7,697,754 B2 | 4/2010 | Park et al. | |
| 2001/0056415 A1* | 12/2001 | Zhu et al. | 707/1 |
| 2002/0006221 A1 | 1/2002 | Shin et al. | |
| 2002/0049786 A1 | 4/2002 | Bibliowicz et al. | |
| 2002/0129058 A1 | 9/2002 | Story et al. | |
| 2002/0154174 A1 | 10/2002 | Redlich et al. | |
| 2003/0081010 A1 | 5/2003 | An Chang et al. | |
| 2003/0110163 A1 | 6/2003 | Chen | |
| 2003/0123737 A1 | 7/2003 | Mojsilovic | |
| 2003/0149939 A1 | 8/2003 | Hubel et al. | |
| 2003/0212692 A1 | 11/2003 | Campos | |
| 2004/0024738 A1 | 2/2004 | Yamane | |
| 2004/0150638 A1 | 8/2004 | Ikeuchi et al. | |
| 2004/0205498 A1 | 10/2004 | Miller | |
| 2004/0210845 A1 | 10/2004 | Paul et al. | |
| 2004/0220957 A1 | 11/2004 | McDonough | |
| 2004/0225635 A1 | 11/2004 | Toyama et al. | |
| 2004/0250205 A1 | 12/2004 | Conning | |
| 2005/0086612 A1 | 4/2005 | Gettman et al. | |
| 2005/0102309 A1 | 5/2005 | Tully | |
| 2005/0108261 A1 | 5/2005 | Glassy et al. | |
| 2005/0138564 A1 | 6/2005 | Fogg | |
| 2005/0165795 A1 | 7/2005 | Myka et al. | |
| 2005/0203931 A1 | 9/2005 | Pingree et al. | |
| 2005/0206657 A1 | 9/2005 | Arcas | |
| 2005/0283490 A1 | 12/2005 | Kaneko | |
| 2006/0041564 A1 | 2/2006 | Jain et al. | |
| 2006/0080342 A1 | 4/2006 | Takaki | |
| 2006/0085442 A1 | 4/2006 | Fujiwara | |
| 2006/0117040 A1 | 6/2006 | Begeja et al. | |
| 2006/0153469 A1 | 7/2006 | Gallagher | |
| 2006/0155684 A1* | 7/2006 | Liu et al. | 707/3 |
| 2006/0280427 A1* | 12/2006 | Snowdon et al. | 386/46 |
| 2007/0110338 A1* | 5/2007 | Snavely et al. | 382/305 |
| 2007/0120856 A1* | 5/2007 | De Ruyter et al. | 345/440 |
| 2007/0230824 A1 | 10/2007 | Alvarez | |

FOREIGN PATENT DOCUMENTS

| | | |
|---|---|---|
| KR | 1020000039600 | 7/2000 |
| KR | 1020010001694 | 1/2001 |

OTHER PUBLICATIONS

Frese et al., "A Methodology for Designing Image Similarity Metrics Based on Human Visual System Models," Proc. of SPIE/IS&T Conf. on Human Vision and Electronic Imaging II, vol. 2016, pp. 472-483, San Jose, CA Feb. 10-13, 1997.

Rodden et al., "Does Organisation by Similarity Assist Image Browsing?" Proc. of SIGCHI Conference on Human Factors in Computing Systems, pp. 190-197, Seattle, WA, Apr. 2001.

Graham et al., "Time as Essence for Photo Browsing Through Personal Digital Libraries," Proceedings of the 2nd ACM/IEEE-CS Joint Conference on Digital Libraries, Jul. 14-18, 2002, Portland Oregon, USA.

D. Lowe, "Distinctive Image Features from Scale-Invariant Keypoints," International Journal of Computer Vision 60, 2, 91-110.

Kentaro Toyoma; "Geographic Location tags on digital images" 2003; ACM; pp. 156-166.

R. Perko, "Computer Vision for Large Format Digital Aerial Cameras", Date: Oct. 2004, http://vicos.fri.uni-lj.si/roli/publications/perko04dissertation_web.pdf.

S. Hsu et al. "Automated Mosaics via Topology Inference", Date: Apr. 2002, http://ieeexplore.ieee.org/iel5/38/21293/00988746.pdf?isNumber=&htry=1.

Sing Bing Kang, "A Survey of Image-based Rendering Techniques", Date: Aug. 1997, http://www.hpl.hp.com/techreports/Compaq-DEC/CRL-97-4.pdf.

Non-Final Office Action, Mailed Dec. 28, 2009, in U.S. Appl. No. 11/461,311, filed Jul. 31, 2006.

Notice of Allowance, Mailed Jan. 4, 2010, in U.S. Appl. No. 11/461,315, filed Jul. 31, 2006.

Notice of Allowance, Mailed May 18, 2010, in U.S. Appl. No. 11/461,280, filed Jul. 31, 2006.

International Search Report dated Jan. 8, 2008.

Non Final Office Action, Mailed Dec. 30, 2010, in U.S. Appl. No. 11/461,311.

Final Office Action, Mailed Jun. 30, 2010, in U.S. Appl. No. 11/461,311.

* cited by examiner

FIG. 4D

| Action | Current Item | Future Item Offered |
|---|---|---|
| Start browsing at C | C | D (based on tour) |
| Randomly Navigate to E | E | A (based on tour) |
| Randomly navigate to B | B | C (based on tour) |
| Hit Back | E | B (based on history) |
| Hit Forward | B | C (based on tour) |
| Hit Back | E | B (based on history) |
| Hit Back | C | E (based on history) |
| Randomly navigate to E | E | A (based on tour) |

FIG. 8

USER INTERFACE FOR NAVIGATING THROUGH IMAGES

PRIORITY

The present application is a divisional of, and claims priority from, co-pending U.S. application Ser. No. 11/461,280 filed Jul. 31, 2006.

BACKGROUND

Conventional peer-to-peer and web-based technologies allow users to search, browse and share millions of photographs via e-mail, personal digital assistants cell phones, web pages, etc. The peer-to-peer and web-based technologies create a large volume of web-accessible photographs rich with implicit semantic information that may be gleaned from the surrounding textual context, links, and other photographs on the same page.

These millions of photographs and images may be stored in one or more connected file systems. Conventionally, a user may have to guess or look thorough a plurality of images stored in such file systems in order to find other images that are similar to one another. Additionally, systems that attempt to determine which images within a file system are similar to one another are sometimes not as accurate as needed. Therefore, it may be beneficial to provide an efficient manner in which users can search and browse through these file systems of images. It may also be beneficial to provide a user interface that can utilize a more accurate method to allow users to select an image and automatically display similar images with the selected image.

SUMMARY

A system, method, and computer-readable media are presented for presenting similar images of a selected image in a user interface. The method can allow a user to select an image and can identify a first set of keypoints within the selected image. Furthermore, the method can identify keypoints within other images stored in an image file system. A similarity metric can be determined for each of the other images with the first selected image. Once the similarity metric has been determined, the other images can be ranked based on the similarity metric. The method can continue by presenting the other images in the ranked order around the first image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4A-4D illustrates embodiments of a user interface for presenting similar images of a selected image around the selected image.

FIG. 8 illustrates an embodiment of a series of actions and future images offered based on a predefined tour

DETAILED DESCRIPTION

Figure 1:
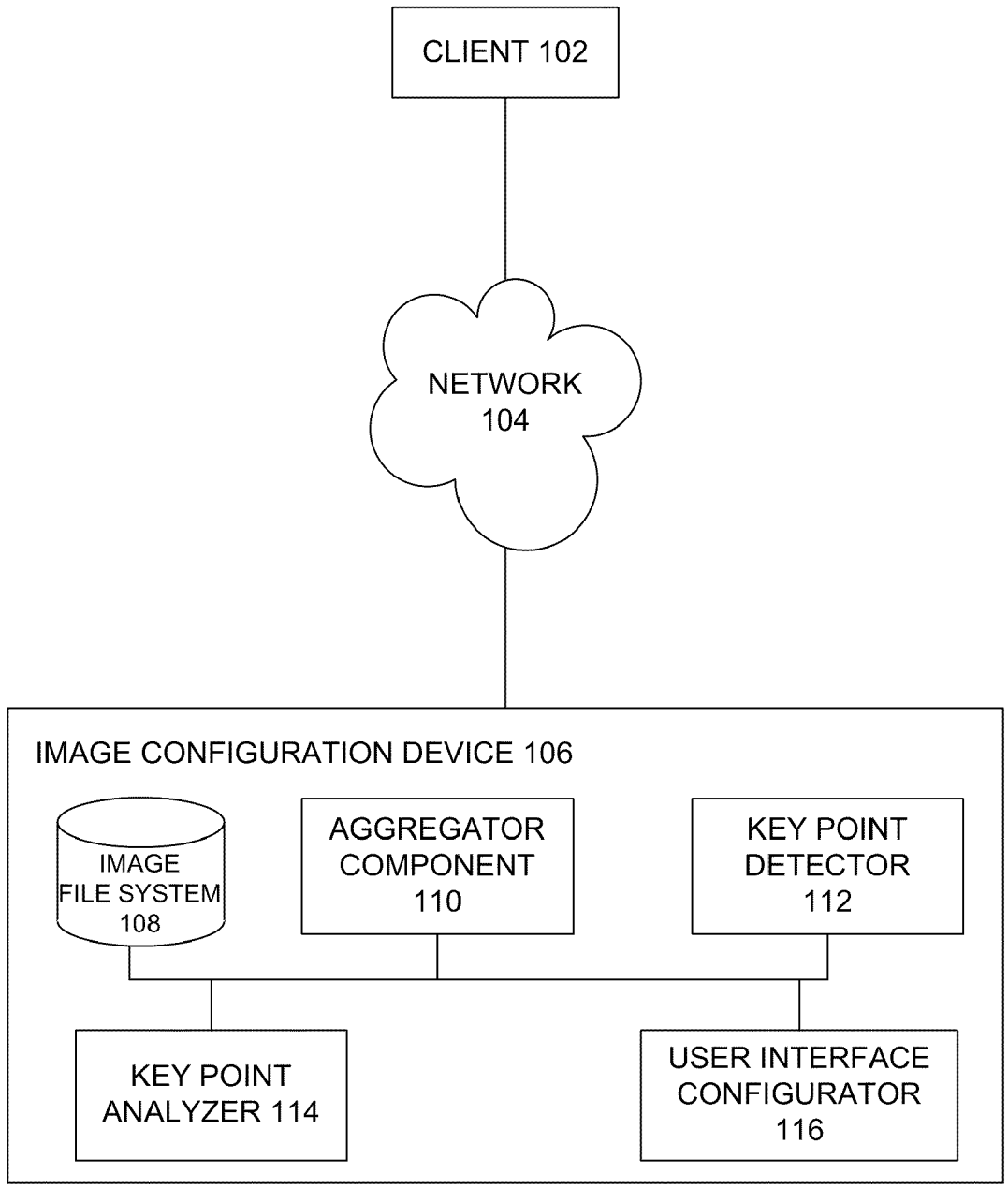
FIG. 1 illustrates an embodiment of a system for implementing the invention.

FIG. 1 illustrates an embodiment of a system for implementing the invention. Client 102 may be or include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device.

Client 102 may also be or can include a server including, for instance, a workstation running the Microsoft Windows®, MacOS™, Unix, Linux, Xenix, IBM AIX™, Hewlett-Packard UX™, Novell Netware™, Sun Microsystems Solaris™ OS/2™, BeOS™, Mach, Apache, OpenStep™ or other operating system or platform.

Client 102 can include a communication interface. The communication interface may be an interface that can allow the client to be directly connected to any other client or device, and allows the client 102 to be connected to a client or device over network 104. Network 104 can include, for example, a local area network (LAN), a wide area network (WAN), or the Internet. In an embodiment, the client 102 can be connected to another client or device via a wireless interface.

Image configuration device (ICD) 106 may also be or can include a server including, for instance, a workstation running the Microsoft Windows®, MacOS™ Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. The ICD 106 can include image file system 108, aggregator component 110, keypoint detector 112, keypoint analyzer 114, and user interface configurator 116. In embodiments of the invention, any one of the components within ICD 106 may be integrated into one or more of the other components within the ICD 106. In other embodiments, one or more of the components within the ICD 106 may be external to the ICD 106. In another embodiment, ICD 106 may be an integrated within client 102. For example, ICD 106 and client 102 may be the same machine.

The aggregator component 110 can be configured to aggregate a plurality of images found within the Internet. In an embodiment, the images can be gathered automatically from crawling the Internet. The aggregator component 110 may also receive images that have been uploaded by users of client machines. Once images are aggregated, they may be subsequently stored in image file system 108. In an embodiment, the images can be grouped and stored by similarity within the image file system 108.

In an embodiment, similarity between images can be determined using the keypoints of each image. A keypoint of an image can be used to identify points in an image that are likely to be invariant to where the image was shot from. Keypoint detector 112 can be used to detect keypoints within images. Keypoint detector 112 can use a variety of algorithms to determine keypoints within images. In an embodiment, the keypoint detector 112 may use the Scale Invariance Feature Transform (SIFT) algorithm to determine keypoints within images. Once a keypoint has been detected within an image, the keypoint can be assigned a particular identifier that can distinguish the keypoint from other keypoints. Each image along with its corresponding keypoints and the keypoints' assigned identifiers can then be stored in image file system 108.

In an embodiment, similarity between images can be determined by images that have many keypoints with the same identifiers in common with each other. Typically, images that are taken that have the same geographic location, landmark, building, statue, or any other distinguishing location depicted in the images will likely have similar or overlapping keypoints, and thus will be grouped together within image file system 108. Accordingly, there can be many groups of images stored in image file system 108 wherein each group may contain a plurality of similar images.

Keypoint analyzer 114 can be used to analyze the keypoints of each image to determine which images within each group are most similar to each other. For example, keypoint analyzer 114 can be configured to employ various algorithms to determine a ranked order of images that are most similar to a selected image. In another example, keypoint analyzer 114 may be used to determine the best neighbor image that is to the right, left, above, or below a selected image for any distance away from the selected image. Furthermore the keypoint analyzer 114 may be used to determine the best neighbor image that best represents a zoomed-in or zoomed-out version of a selected image to any degree of magnification or demagnification.

User interface configurator (UIC) 116 can be used to transmit images to a client that will present the images to a user within a user interface (UI). UIC 116 can determine which images to present and the manner in which they will be presented depending on a request from a user and any determinations made by the keypoint analyzer 114. The UIC 116 can make its determination on how to present images through use of a layout algorithm.

Figure 2:
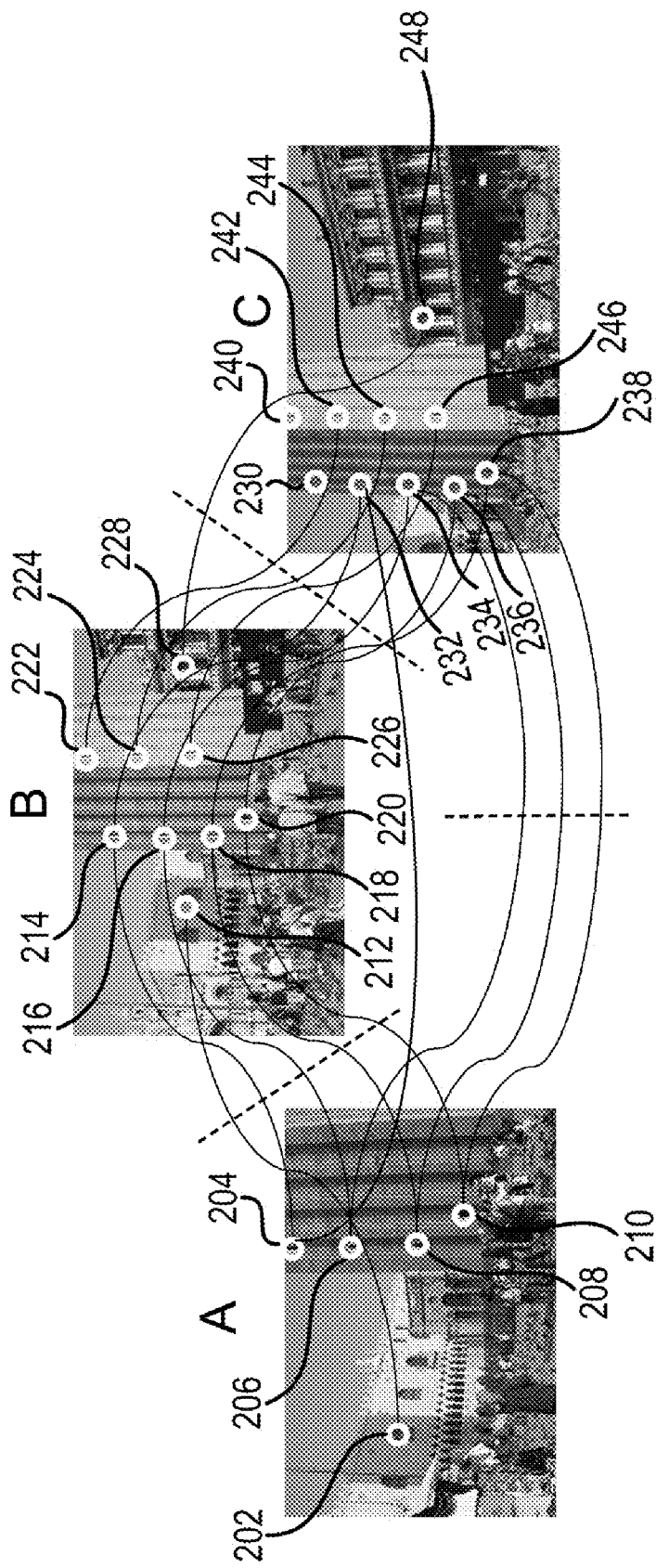
FIG. 2 illustrates an embodiment of images with identified keypoints labeled on the images.

FIG. 2 illustrates an embodiment of images with identified keypoints labeled on the images. Images A, B, and C each have keypoints that have been identified on them. Each keypoint within each image can have an assigned identifier, wherein identical keypoints in more than one image can have the same identifier. Image A contains keypoints 202, 204, 206, 208, and 210 that are respectively identical to keypoints 212, 214, 216, 218, and 220 in Image B. As such, each identical keypoint can have the same identifier. Keypoints 204, 206, 208, and 210 from Image A are respectively identical to keypoints 232, 234, 236, and 238 from Image C, in which each identical keypoint can have the same identifier. Keypoints 214, 216, 218, 220, 222, 224, 226, and 228 are respectively identical to keypoints 232, 234, 236, 238, 242, 244, 246, and 248, in which each identical keypoint can have the same identifier.

Figure 3:
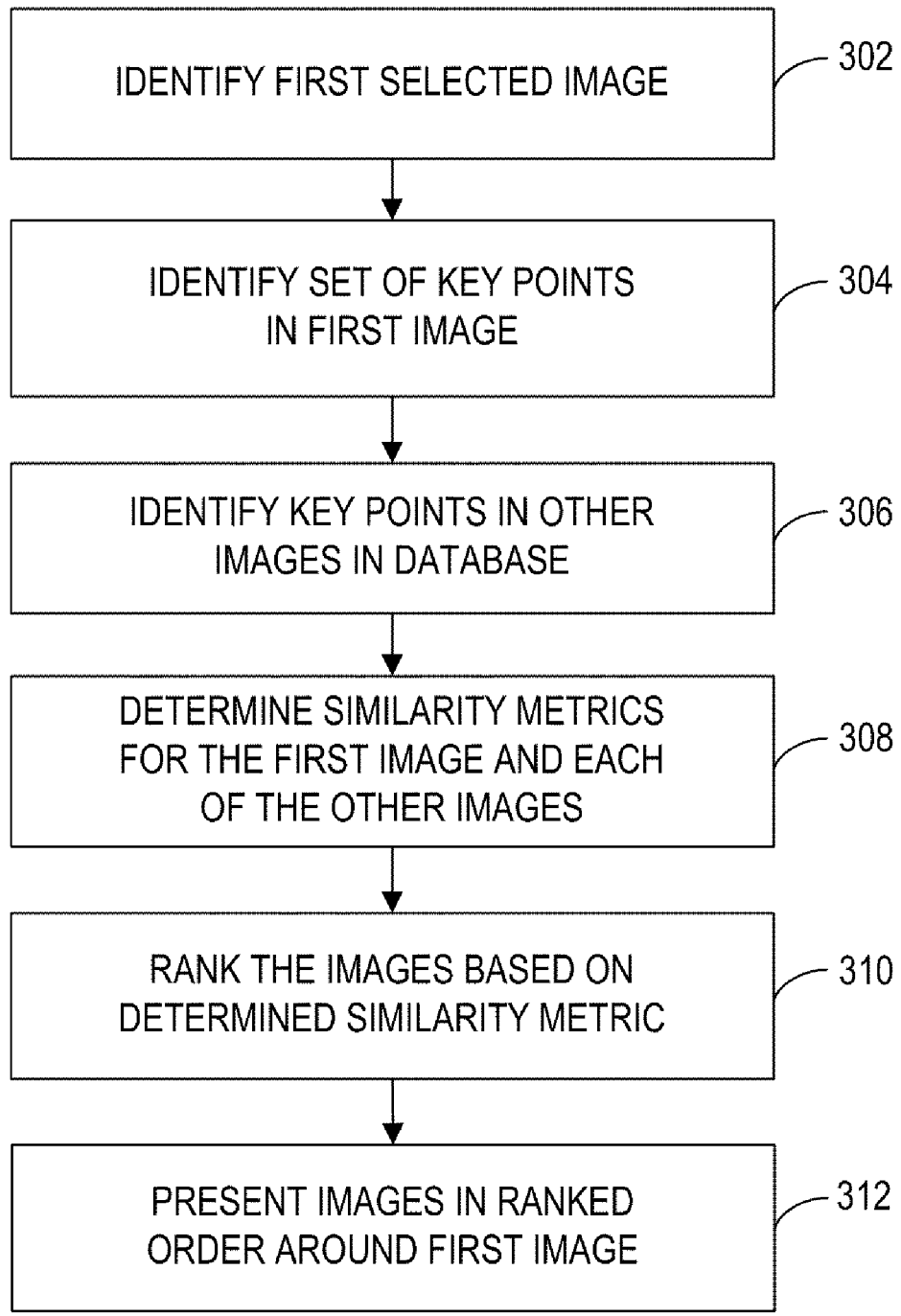
FIG. 3 illustrates an embodiment of a method for presenting similar images of a selected image within a user interface.

FIG. 3 illustrates an embodiment of a method for presenting similar images within a user interface. The invention can allow a user of a client to connect with ICD 106 (FIG. 1) in order to view one or more images stored in image file system 108 (FIG. 1). In an embodiment, the user can be presented with a UI on his client in order to select a particular image of interest from the plurality of images stored in the image file system 108.

At operation 302, a first selected image is identified. At operation 304, a set of keypoints within the selected image is identified. In an embodiment, if the keypoints of the selected image were previously determined when the selected image was initially aggregated into the image file system 108, identifying the keypoints can include identifying the corresponding keypoints that have been stored with the selected image. In another embodiment, identifying the keypoints in the selected image can be done on-the-fly with a keypoint detector 112 (FIG. 1) once the selected image has been selected.

At operation 306, the keypoints of other images within image file system 108 are identified. In an embodiment, the other images can include the images within the same group as the selected image. In another embodiment, the other images can include all images within the image file system 108. In an embodiment, if the keypoints of the other images were previously determined when the other images were initially aggregated into the image file system 108, identifying the keypoints can include identifying the corresponding keypoints that have been stored with each of the other images. In another embodiment, identifying the keypoints in the other images can be done on-the-fly with a keypoint detector 112 (FIG. 1) once the selected image has been selected.

At operation 308, a similarity metric can be determined for the selected image and each of the other images. A similarity metric can be used to determine a level of similarity between the selected image and each of the other images. In an embodiment, the similarity metric can represent the distance as measured by the points of difference between the selected image and a compared image. The compared image can be an image from the other images that is currently being compared to the selected image. In other embodiments, the similarity metric may be determined by employing considerations of certain distance components. Such distance components may include, but is not limited to: the Euclidian distance between the camera locations for the selected image and the compared image; the angular separation between the vectors corresponding to the directions in which the selected image and the compared image were taken/photographed; and/or the difference between the focal lengths of the selected image and the compared image. Moreover, in other embodiments, the similarity metric may be determined using non-spatial distance components. Such non-spatial distance components may include, but is not limited to: image luminance, time-of-day, lighting direction, and metadata-related factors.

The invention can be configured to utilize a number of different types of algorithms for determining the various different embodiments of similarity metrics listed above. For example, several different types of algorithms can be employed when the similarity metric to be determined is the distance as measured by the points of difference between the selected image and a compared image. One such algorithm is as follows:

$$Dist_{(Sel\ Im, Comp\ Im)} = \text{Total Keypoints}_{(Sel\ Im + Comp\ Im)} - (2 \times \text{Common KeyPoints}) \quad (1)$$

Algorithm 1 above states that in order to determine the distance as measured by the points of difference between the selected image and a compared image ("$Dist_{(Sel\ Im,\ Comp\ Im)}$", the algorithm subtracts twice the number of keypoints that the selected image and a compared image have in common ("(2× Common Points)") from the summation of the total keypoints identified in both the selected image and the compared image ("Total Keypoints$_{(Sel\ Im+Comp\ Im)}$"). The common keypoints can be determined by identifying the keypoints within the selected image and the compared image that have the same assigned identifiers.

FIG. 2 will now be referred to in order to illustrate examples determining a similarity metric using the above algorithm. Suppose Image A was the selected image, and Images B and C are the other images that will be compared to Image A. When Image B is the compared image, it can be determined that Image A contains keypoints 202, 204, 206, 208, and 210 that are respectively identical to keypoints 212, 214, 216, 218, and 220 in Image B. Thus, Image A and Image B have 5 common keypoints. Image A contains 5 total keypoints and Image B contains 9 total keypoints, which means that there are 14 total keypoints identified in both images. Therefore, by following Algorithm 1, the similarity metric would be 14−(2×5) which would equal to 4, wherein 4 would represent the distance as measured by the points of difference between Image A and Image B.

When Image C is the compared image, it can be determined that Image A contains keypoints 204, 206, 208, and 210 that are respectively identical to keypoints 232, 234, 236, and 238 from Image C. Thus, Image A and Image C have 4 common keypoints. Image A contains 5 total keypoints and Image C contains 10 total keypoints, which means that there are 15 total keypoints identified in both images. Therefore, by following the Algorithm 1, the similarity metric would be 15−(2×4) which would equal to 7, wherein 7 would represent the distance as measured by the points of difference between Image A and Image C.

In determining the similarity metric for finding the distance as measured by the points of difference between a selected image and a compared image, the smaller the distance between the two images, the more similar they are judged to be. For example, the distance between Image A and Image B is 4 and the distance between Image A and C is 7. Therefore, Image B is judged to be more similar to Image A than Image C is to Image A. When Algorithm 1 is applied to Image B and Image C, the distance is determined to be 3, which would mean that Images B and C are more similar to each other than each image is to Image A.

Referring back to FIG. 3, at operation 310, the other images compared to the selected image can be ranked based on their corresponding determined similarity metrics. In an embodiment, the other images can be ranked in a descending order of similarity using each image's corresponding similarity metric. Once the other images have been ranked, at operation 312, the other images can be presented in the ranked order around the selected image in a UI of the user's client.

Figure 4A:
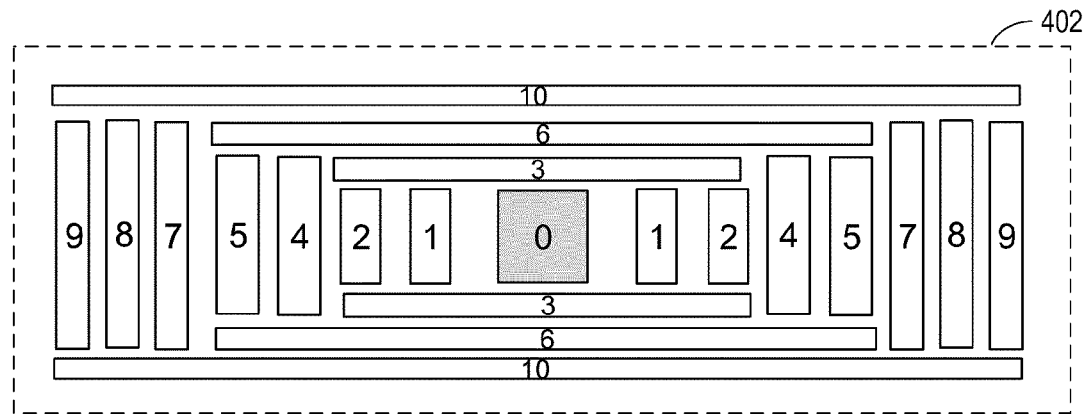

FIGS. 4A, 4B, 4C, and 4D illustrate embodiments of a user interface for presenting similar images of a selected image around the selected image. FIG. 4A illustrates an embodiment in which the ranked other images are presented in concentric bands around the selected image, wherein the selected image is represented by the image "0". Each band can be configured to contain a specified number of other images that will be presented to a user. The other images are placed in the bands 1-10 in a descending order of similarity, wherein the other images that are the most similar to the selected image are presented nearest to the selected image. For example, the bands labeled "1" contain the other images that are the most similar to the selected image, and the bands labeled "10" contain the other images that are least similar to the selected image.

In an embodiment, each band may contain other images having corresponding similarity metrics. For example, the bands labeled "1" could contain the other images that have corresponding similarity metrics of 0, the bands labeled "2" could contain the other images that have corresponding similarity metrics of 1, the bands labeled "3" could contain the other images that have corresponding similarity metrics of 2, etc. In another embodiment, the bands could contain a range of similarity metrics. In such an embodiment, bands labeled "1" could contain other images that have similarity metrics of 0-2, bands labeled "2" could contain other images that have similarity metrics of 3-5, etc.

Figure 4B:
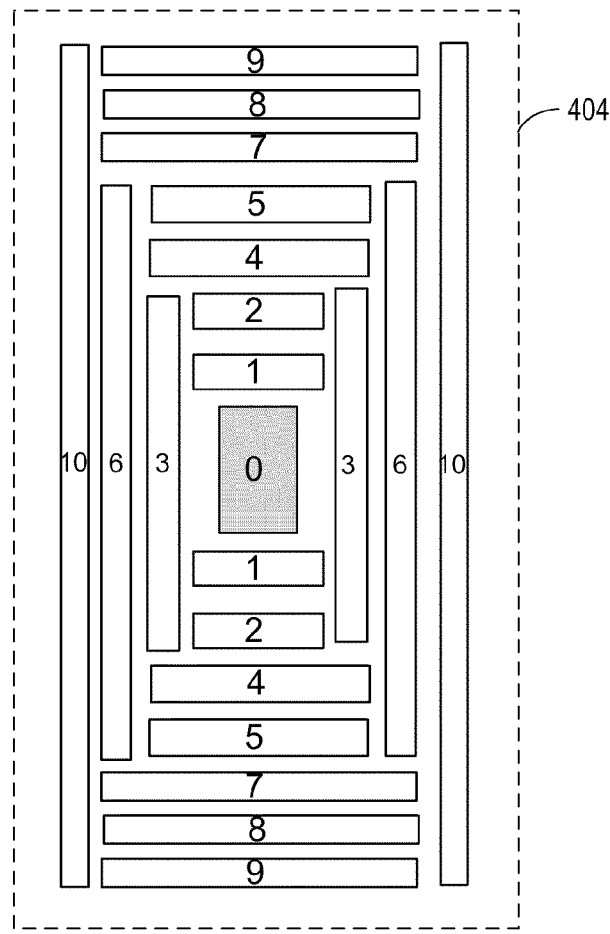

When presenting the images within the user's UI, the images may be presented in manner that is scaled to fit the shape of the user's screen space. As shown in FIG. 4A, the user's screen space 402 is widescreen. As such, more bands of other images are presented to the left and right of the selected image than below and above the selected image. However, as shown in FIG. 4B, a user that has a taller and narrower screen space 404 can have the concentric bands scaled to fit that type of screen space by presenting more bands above and below the selected image than to the left and the right of the selected image.

Figure 4C:
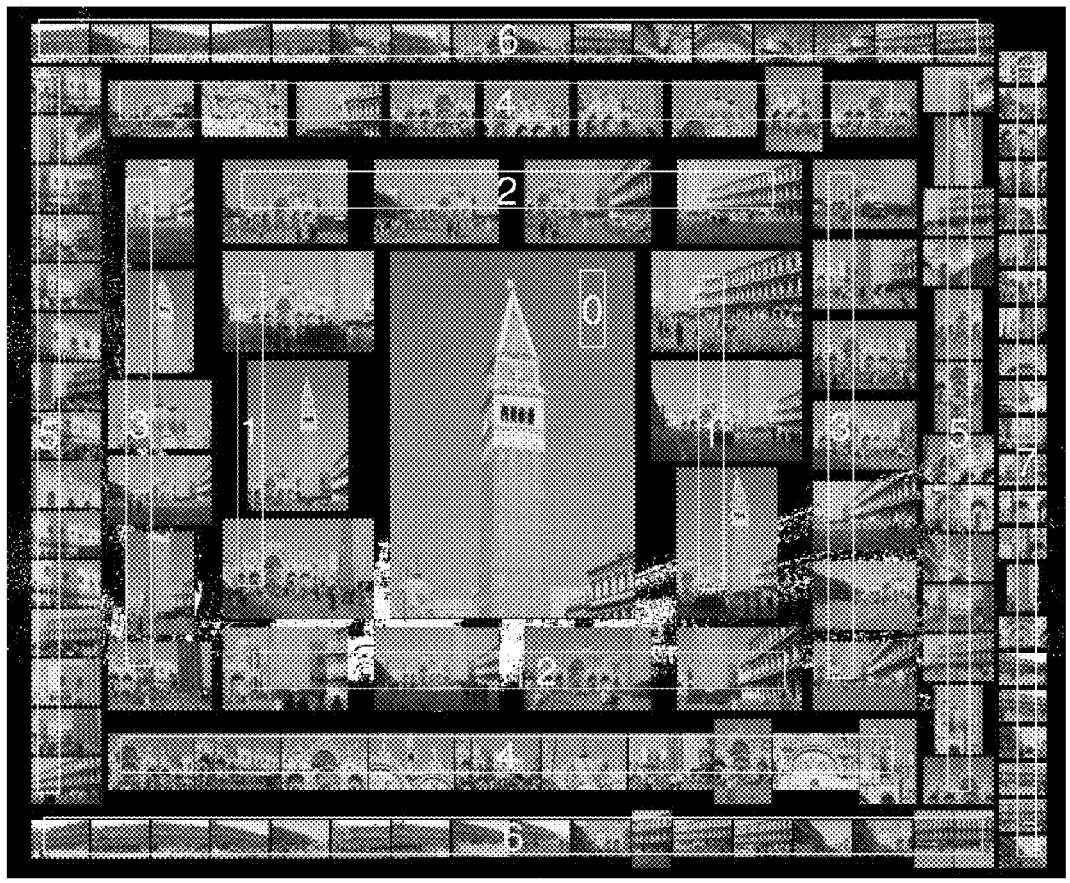

FIG. 4C illustrates another embodiment for presenting similar images of a selected image around the selected image. As shown in FIG. 4C, the images that have a higher similarity ranking are presented closer to the selected image 0 and are larger than images that are further away from the selected image 0 with lower similarity rankings.

Figure 4D:
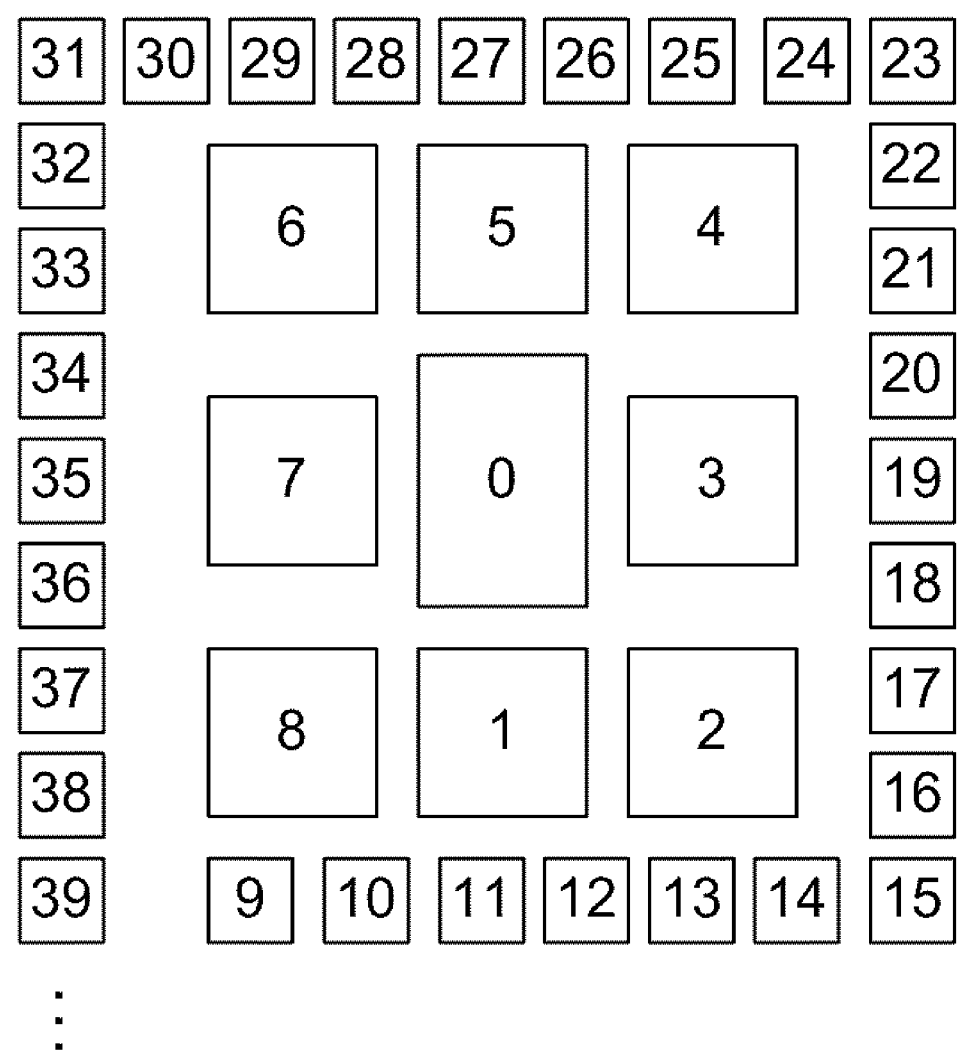

FIG. 4D illustrates yet another embodiment for presenting similar images of a selected image around the selected image. As shown in FIG. 4D, images can be presented around the selected image in a spiral format. The most similar image, as determined by the calculated similarity metrics of each of the other images, can be presented in section "1". The rest of the other images can be presented in a descending order of relevance in the ascending numbered sections, wherein the level of similarity of the presented images will decrease as the numbered sections increase. Again, the placement of the other images around the selected image can be determined by the corresponding similarity metric of each of the other images in relation to the selected image. Also, as shown in FIG. 4D, the images that have a higher similarity ranking (closer to the selected image) may be presented larger than images with a lower similarity ranking (further away from the selected image). In yet another embodiment, bands containing a plurality of images can be presented around the selected image in a spiral format. In such an embodiment, the bands can contain the other images that have the same similarity metric, or the bands can contain range other images that correspond to a particular range of similarity metrics; for example, the first band could contain other images that have similarity metrics between 0 and 5.

The invention can also be configured to allow a user to navigate in any direction from a selected image within a UI of the user's client. When a user selects an image within the UI, there can be an option that allows the user to input a direction such as to the left, to the right, above, below, zoom-in, or zoom-out in order to navigate from the selected image to another image. Once the user selects the direction, the invention can be configured to determine a best neighbor image within the image file system 108 that best presents a representation of what is next to the selected image in the specified direction. The best neighbor image can include overlapping parts of the selected image. A best neighbor image can be determined in any direction that is to the right, left, above, or below a selected image for any distance away from the selected image. Furthermore, a best neighbor image can be determined that best represents a zoomed-in or zoomed-out version of a selected image to any degree of magnification or demagnification.

Figure 5:
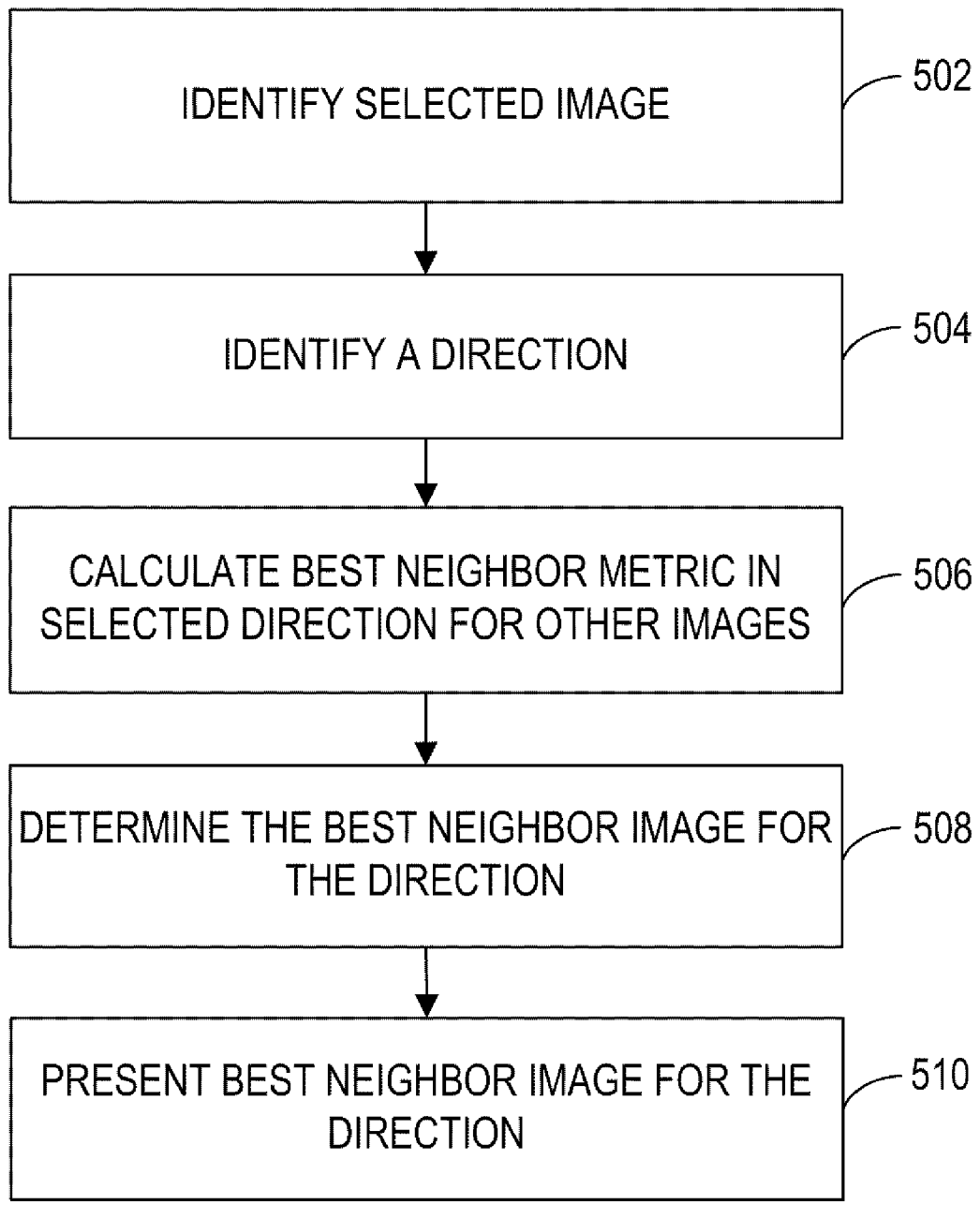
FIG. 5 illustrates an embodiment of a method for presenting overlapping best neighbor images in a user interface.

FIG. 5 illustrates an embodiment of a method for presenting overlapping best neighbor images in a user interface. At operation 502, a first selected image is identified. At operation

504, a direction from the selected image is identified. At operation 506, a best neighbor metric can be calculated for each of the other images in the image file system based on the direction. In an embodiment, the best neighbor metric can represent distance as measured by the points of difference between the selected image and a compared image relative to the direction. Again, the compared image can be an image from the other images that is currently being compared to the selected image. In an embodiment, the compared image can be chosen from the images within the same group as the selected image. In another embodiment, the compared image be chosen from all images within the image file system 108.

Calculating the best neighbor metric may depend on the particular direction that is selected. In an embodiment, a different algorithm for calculating the best neighbor metric for the selected image and the compared image can be utilized for each direction. Additionally, there may be more than one type of algorithm that each direction can be configured to utilize for calculating best neighbor metrics for two images.

The two following algorithms can be used to calculate best neighbor metrics for directions to the right and to the left of a selected image respectively:

$$ND_{R(Sel\ Im, Comp\ Im)} = \text{Total Keypoints}_{(Rt\text{-}H\ Sel\ Im)} - \text{Common Keypoints}_{(Lt\text{-}H\ Comp, Rt\text{-}H\ Sel\ Im)} \quad (2)$$

$$ND_{L(Sel\ Im, Comp\ Im)} = \text{Total Keypoints}_{(Lt\text{-}H\ Sel\ Im)} - \text{Common Keypoints}_{(Rt\text{-}Hf\ Comp, Lt\text{-}H\ Sel\ Im)} \quad (3)$$

Algorithm 2 calculates a best neighbor metric that represents a right neighbor distance between a selected image and a compared image. Algorithm 2 states that in order to calculate the right neighbor distance between a selected image and a compared image ("$ND_{R(Sel\ Im,\ Comp\ Im)}$"), the algorithm subtracts the total number of keypoints that the left half of the compared image and the right half of the selected image have in common ("Common Keypoints$_{(Lt\text{-}H\ Comp, Rt\text{-}H\ Sel\ Im)}$") from the total number of keypoints identified in the right half of the selected image ("Total Keypoints$_{(Rt\text{-}H\ Sel\ Im)}$").

Algorithm 3 calculates a best neighbor metric that represents a left neighbor distance between a selected image and a compared image. Algorithm 3 states that in order to calculate the left neighbor distance between a selected image and a compared image ("$ND_{L(Sel\ Im,\ Comp\ Im)}$"), the algorithm subtracts the total number of keypoints that the right half of the compared image and the left half of the selected image have in common ("Common Keypoints$_{(Rt\text{-}Half\ Comp,\ Lt\text{-}H\ Sel\ Im)}$") from the total number of keypoints identified in the left half of the selected image ("Total Keypoints$_{(Lt\text{-}H\ Sel\ Im)}$"). Again, for both Algorithm 2 and 3, the common keypoints can be determined by identifying the keypoints within the selected image and the compared image that have the same assigned identifiers.

Figure 6A:
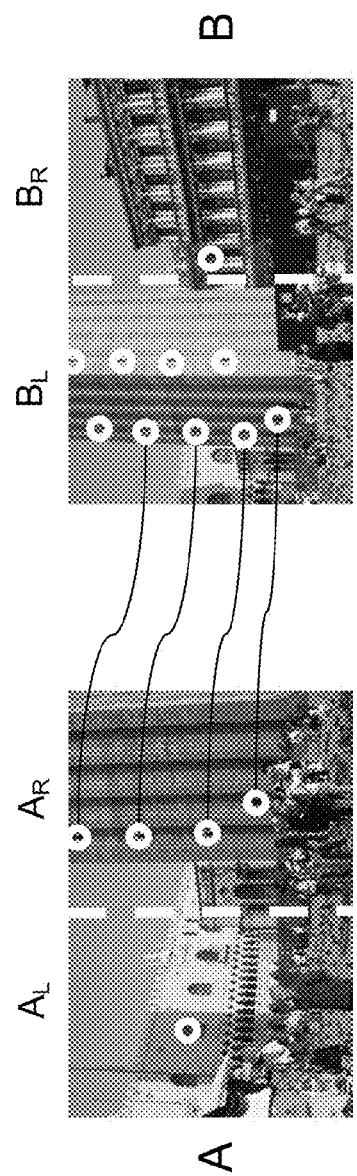
FIG. 6A presents two images that illustrate an embodiment of how left and right best neighbor metrics are calculated.

FIG. 6A presents two images that illustrate an embodiment of how left and right best neighbor metrics are calculated. First, an embodiment for calculating a right best neighbor metric will be described. Suppose that Image A is the selected image and Image B is the compared image. When calculating the right neighbor distance from Image A to Image B, each image can be divided vertically in half. The common keypoints found in the left-half of the compared image and the right-half of the selected image can be determined. In this example there are 4 common keypoints. The total keypoints found in the right-half of Image A can then be identified, which in this example is 4 keypoints. The common keypoints can then be subtracted from the total number of keypoints identified in the right-half of Image A. In this example result would be a right best neighbor metric of 0. In an embodiment, the smaller the best neighbor metric, the more the compared image is judge to be a good best neighbor for the selected direction.

Now an embodiment for calculating a left best neighbor metric will be described. Suppose Image B is the selected image and Image A is the compared image. Again, both images can be divided vertically in half. The common keypoints found in the right-half of the compared image and the left-half of the selected image can be determined. In this example there are 4 common keypoints. The total keypoints found in the left-half of Image B can then be identified, which in this example is 9 keypoints. The common keypoints can then be subtracted from the total number of keypoints identified in the left-half of Image B. In this example result would be a right best neighbor metric of 5. Again, the smaller the best neighbor metric, the more the compared image is judge to be a good best neighbor for the selected direction. Thus, Image B may be considered to be a better right best neighbor image to Image A than Image A being a left best neighbor image to Image B.

The two following algorithms can be used to calculate best neighbor metrics for directions above and below a selected image respectively:

$$ND_{U(Sel\ Im, Comp\ Im)} = \text{Total Keypoints}_{(Up\text{-}H\ Sel\ Im)} - \text{Common Keypoints}_{(Lo\text{-}H\ Comp, Up\text{-}H\ Sel\ Im)} \quad (4)$$

$$ND_{D(Sel\ Im, Comp\ Im)} = \text{Total Keypoints}_{(Lo\text{-}H\ Sel\ Im)} - \text{Common Keypoints}_{(Up\text{-}H\ Comp, Lo\text{-}H\ Sel\ Im)} \quad (5)$$

Algorithm 4 calculates a best neighbor metric that represents an upper neighbor distance between a selected image and a compared image. Algorithm 4 states that in order to calculate the upper neighbor distance between a selected image and a compared image ("$ND_{u(Sel\ Im,\ Comp\ Im)}$"), the algorithm subtracts the total number of keypoints that the lower-half of the compared image and the upper-half of the selected image have in common ("Common Keypoints$_{(Lo\text{-}H\ Comp,\ Up\text{-}H\ Sel\ Im)}$") from the total number of keypoints identified in the upper half of the selected image ("Total Keypoints$_{(Up\text{-}H\ Sel\ Im)}$").

Algorithm 5 calculates a best neighbor metric that represents a downward neighbor distance between a selected image and a compared image. Algorithm 5 states that in order to calculate the downward neighbor distance between a selected image and a compared image ("$ND_{D(Sel\ Im,\ Comp\ Im)}$"), the algorithm subtracts the total number of keypoints that the upper-half of the compared image and the lower-half of the selected image have in common ("Common Keypoints$_{(Up\text{-}H\ Comp,\ Lo\text{-}H\ Sel\ Im)}$") from the total number of keypoints identified in the lower half of the selected image ("Total Keypoints$_{(Lo\text{-}H\ Sel\ Im)}$"). Again, for both Algorithm 4 and 5, the common keypoints can be determined by identifying the keypoints within the selected image and the compared image that have the same assigned identifiers.

When calculating the upper and downward best neighbor metrics, the upper and lower halves of each image can be determined by dividing each image in half horizontally. However, all other calculations are done in the same exact manner when calculating the left and right best neighbor metrics as described above. In an embodiment, when identifying keypoints located in either a left-half, right-half, upper-half, or lower half of any image, if a keypoint is located directly on the dividing line of the image, the algorithms can be configured to include that keypoint as part of the total count of keypoints for the half. In other embodiments, the algorithms may be configured to disregard the keypoint from the total count of keypoints for the half.

The two following algorithms can be used to calculate best neighbor metrics for directions corresponding to zooming-out and zooming in from a selected image respectively:

$$ND_{O(Sel\ Im, Comp\ Im)} = \text{Total Keypoints}_{(Sel\ Im)} - \text{Common Keypoints}_{(Interior\ Comp\ Im, Sel\ Im)} \quad (6)$$

$$ND_{I(Sel\ Im, Comp\ Im)} = \text{Total Keypoints}_{(Interior\ Sel\ Im)} - \text{Common Keypoints}_{(Comp\ Im, Sel\ Im)} \quad (7)$$

Figure 6B:
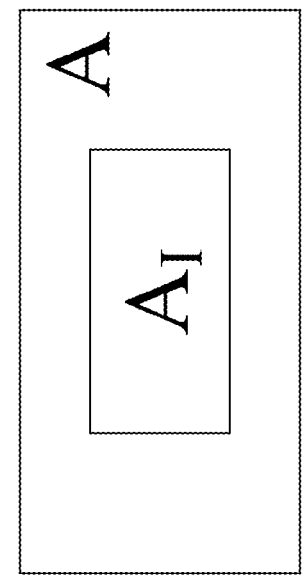
FIG. 6B illustrates an embodiment of the relationship between an Image A and the Interior-Image A ($A_I$).

Algorithm 6 calculates a best neighbor metric that represents an outward neighbor distance between a selected image and a compared image, wherein the outward neighbor distance can be used to represent an image that would depict a zoomed-out version of the selected image. Algorithm 6 states that in order to calculate the outward neighbor distance between a selected image and a compared image ("$ND_{O(Sel\ Im,\ Comp\ Im)}$"), the algorithm subtracts the total number of keypoints that the interior-compared image and the entire selected image have in common ("Common Keypoints$_{(Interior\ Comp\ Im,\ Sel\ Im)}$") from the total number of keypoints identified in the entire selected image ("Total Keypoints$_{(Sel\ Im)}$"). In an embodiment, the interior-compared image can be any fraction/portion of the compared image having the same center point as the compared image. In other embodiments, the interior-compared image can have a different center point from the compared image. The interior-compared image can be, for example, a quarter of the compared image. FIG. 6B illustrates an embodiment of the relationship between an Image A and the Interior-Image A ($A_I$).

Algorithm 7 calculates a best neighbor metric that represents an inward neighbor distance between a selected image and a compared image, wherein the inward neighbor distance can be used to represent an image that would depict a zoomed-in version of the selected image. Algorithm 7 states that in order to calculate the inward neighbor distance between a selected image and a compared image ("$ND_{I(Sel\ Im,\ Comp\ Im)}$"), the algorithm subtracts the total number of keypoints that the compared image and the entire selected image have in common ("Common Keypoints$_{(Comp\ Im, Sel\ Im)}$") from the total number of keypoints identified in the interior-selected image ("Total Keypoints$_{(Interior\ Sel\ Im)}$"). In an embodiment, the interior-selected image can be a fraction/portion of the selected image having the same center point as the compared image. In other embodiments, the interior-compared image can have a different center point as the compared image. The interior-selected image can be, for example, a quarter of the compared image. Again, for both Algorithm 6 and 7, the common keypoints can be determined by identifying the keypoints within the selected image and the compared image that have the same assigned identifiers.

In an embodiment, when identifying keypoints located within an interior image, if a keypoint is located directly on the dividing lines of the interior image, the algorithms can be configured to include that keypoint as part of the total count of keypoints for the interior image. In other embodiments, the algorithm may be configured to disregard the keypoint from the total count of keypoints for the interior image.

Referring back to FIG. 5, once the best neighbor metrics have been calculated for each of the other images, at operation 508, the best neighbor image is determined for the direction. In an embodiment, the image with the lowest best neighbor metric can be considered to be the best neighbor of the selected image for the direction. In an embodiment, when there are multiple images that have the same lowest best neighbor metric, one of those images can be randomly chosen to be the best neighbor image. In other embodiments, when there are multiple images that have the same lowest neighbor metric, a best neighbor image can be chosen by evaluating such factors such as, but not limited to, image resolution, focal lengths, camera angles, time of day when the image was taken, how recently the image was taken, and popularity of the images. In an embodiment, popularity can be determined from such factors including, but not limited to: the number of users who have selected the image; and the number of seconds users have kept the image displayed on their screens. In other embodiments, popularity can be used to determine best neighbor images in instances other than when there are multiple image with the same lowest neighbor metric. For example, popular images that would otherwise have a lower calculated best neighbor metric may be chosen as the best neighbor over images that have a higher calculated best neighbor metric. At operation 510, once the best neighbor image has been determined, the best neighbor image can be presented to the user in an UI.

Using the best neighbor metric algorithms, a user can select a first image and can navigate through a series of images in a particular direction, wherein the next image to be displayed is determined by the best neighbor metric algorithm for the selected image. Typically, if the user moves to one neighbor in one direction followed by a one neighbor move in the opposite direction, the user will generally expect to be back where they started. For example, if the user navigates one neighbor to the right of a first selected image followed by one neighbor move to left, the user will typically expect to be back where he started at the first selected image. However, in the same example, when using the best neighbor algorithms to determine which image should be displayed to a user, the first selected image may not be the best neighbor image in the left direction as the best right neighbor image. This example can be realized by referring back to FIG. 6A. As previously calculated, the right neighbor distance metric from Image A to Image B was 0, thereby making Image B a very good candidate for being Image A's best right neighbor. However, as previously calculated, the left neighbor distance metric from Image A to Image B was 5, which may not guarantee that Image A will be Image B's best left neighbor. If Image A is not Image B's best left neighbor, another image may unexpectedly be presented to the user instead.

Figure 7:
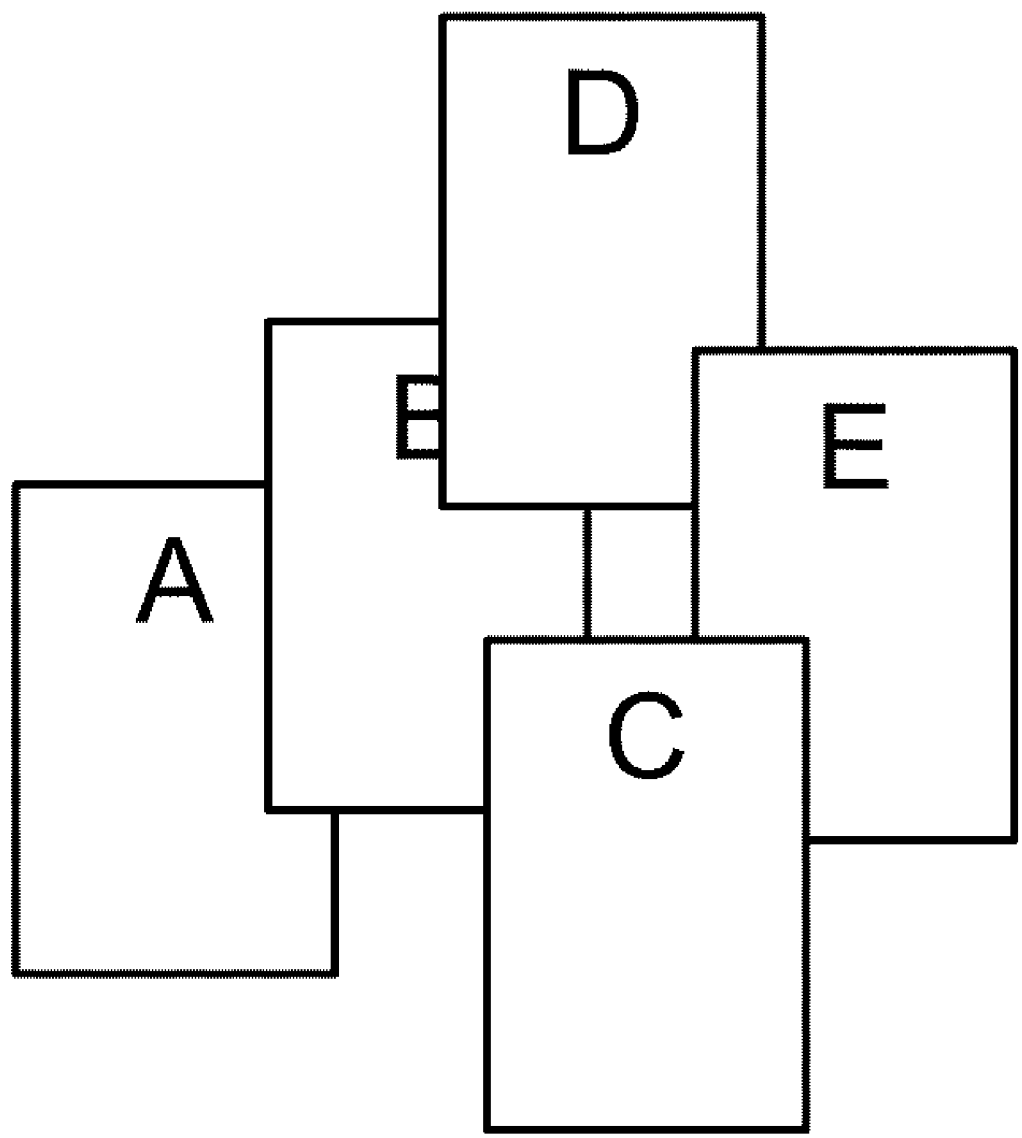
FIG. 7 illustrates an embodiment of navigations paths through a set of images.

Another example can be described with reference to FIG. 7. FIG. 7 illustrates an embodiment of navigation paths through a set of images. For example, imagine that images A-E are overlapping images of the same geographical location. Suppose that a left to right best neighbor path was calculated to be A→B→C→E. However, a right to left best neighbor path may be calculated to be E→D→B→A, in which the user would not go back in the same order from which he originally navigated.

The invention can solve this dilemma through one of its embodiments. In an embodiment, the invention can be configured to use a user's navigation history, as well as the best neighbor algorithms, to determine which image to present for a selected direction. In such an embodiment, when asked to navigate in any direction, the invention can be configured to examine the user's navigation history stack before any action is taken. If the top item of the history stack is a move in the exact opposite direction as the selected direction, then the action taken is "back" instead of using a best neighbor metric algorithm. The action "back" can simply display the image that was displayed directly previous to the image the user is currently navigating in the opposite direction from.

In an embodiment, the invention can be configured to allow a user to select a group of similar images by using a UI of the user's client. When the user selects the group of images, the invention can be configured to present the user with the "best overview image" that can be an overview image of all of the images within the group. In an embodiment, the best overview image can be determined by identifying the image within the group that has at least one keypoint in common with the largest number of other images within the group. In an embodiment, if multiple images share the largest number of connections, then any one of the images can be randomly chosen to be the best overview image. In other embodiments, when there are multiple images that share the largest number of connections, the best overview image can be chosen by evaluating factors such as, but not limited to, image resolution, focal lengths, camera angles, time of day when the image was taken, how recently the image was taken and popularity.

Applications such as web browsers that have a notion of history can present a back/forward interface to explore this history and allow the user to retrace their steps. "Forward" may usually not be defined when you are not exploring your history. "Back" may not defined until you have moved away from your starting location. This may lead to buttons in the application that are usually grayed out and inactive.

The invention can be configured to relate to finite sets of images upon which it may be possible to define a sequence or tour of a predefined ordering for some or all of the images. In an embodiment, tours may be cyclic, so that a tour forms a closed loop and ends where it began. For example, tours may be especially useful for collections of up to thousands of images.

In an embodiment, using a predefined tour, every image can have both a back and a forward image before a user selects an image or begins to navigate from a selected image. The Forward image can be defined as either the next item in the tour from the current image if you are not exploring history or the next image in your history stack if you are exploring history. History explorations, for example, can start with a back image and end as soon as either the user's stack of back images and forward images is cleared or the user randomly navigates away.

To make this clearer, imagine a set of items, A, B, C, D, E that have a predefined tour in the order: A→B→C→D→E→A.... Assume the user starts navigating this set by looking first at image C. FIG. 8 illustrates an embodiment of a series of actions and future images offered based on the predefined tour for this example. If there is no further history to explore, either because the user has not navigated anywhere yet or because the user has "backed" out his entire history, the tour is used to synthesize a back image. The image chosen may be the predecessor to the current image in the tour.

Zooming and panning large images or large collections of images can be a complex user action, because it is usually presented as two separate actions. For example, to get from a view of the entire world, to a particular block in a particular city, such as Seattle, usually requires a sequence such as: zoom-in, pan a little so that Washington state is in the center of the window; zoom in a bit more; pan a little so that Seattle is in the center of the picture; zoom in further; etc. Conventionally, when a user selects with a mouse cursor an area on an image to zoom in or out on, the image will be repositioned within the user's UI so that the section that the user selected is now positioned in the center of the UI. In such an example, the mouse cursor will no longer be located precisely over the same exact location that the user initially selected.

The invention also allows the user to zoom in and out of images with any type of input device through a technique called "point-zooming," which combines zooming and panning. The input devices that can be used with point-zooming can include, but is not limited to, a mouse, a mouse with a mouse-wheel, a keyboard, a touch-screen input, a joystick, or any other input device or combination of input devices that can allow a user to simultaneously select an area of an image and issue a zoom-in or zoom-out command. The mouse wheel on a mouse input device, for example, can allow for a efficient motion that combines zooming and panning.

With point zooming, a user can scroll the mouse wheel, for example, to either zoom in or out on an image depending on where the mouse cursor is located on the image. With point zooming, the user does not have to move his cursor to zoom in on a particular region of an image designated by the mouse cursor. A user can simply point the cursor to a section of an image, and with a mouse wheel for example, the user can continuously zoom in or out exactly where the cursor is without having to move the mouse or the cursor. With point-zooming, the mouse cursor is the focal point in which zooming out or in takes place without having to reposition the zooming focal point in the center of the UI. Also with point zooming, if the user's mouse is in the center of the window, then zooming in or out is similar to conventional center-based zooming. However, when the cursor is near the corner of the window for example, the action combines zooming and panning at the precise location where the mouse cursor is located on the image.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A method for presenting similar images of a selected image in a user interface, comprising:
   identifying a first selected image;
   identifying a first set of one or more keypoints in the first image;
   identifying a plurality of sets of one or more keypoints in a plurality of other images;
   determining a plurality of similarity metrics between the first set and each of the plurality of sets of keypoints, wherein the similarity metrics are a level of similarity between the first image and the plurality of other images, wherein the similarity metrics are distances as measured by points of differences between the first image and the plurality of other images, the distances being determined using a distance algorithm that examines the keypoints that the first image and each of the plurality of other images have in common and the distance algorithm determines the similarity metrics for each of the plurality of other images by subtracting twice the number of keypoints that the first image and a compared image of the plurality of other images have in common from the total number of keypoints found in the first image and the compared image;

ranking the plurality of other images based on the similarity metrics; and presenting the plurality of other images in the ranked order around the first image.

2. The method according to claim 1, wherein the similarity metrics are at least one of an Euclidian distance between a camera location for the first image and each of the plurality of other images, an angular separation between vectors corresponding to the directions in which the first image and each of the plurality of other images were photographed, and the difference between the focal lengths of the first image and each of the plurality of other images, and any combination of these techniques.

3. The method according to claim 1, further comprising presenting the plurality of other images in a ranked order in at least one of concentric bands and a spiral of images around the first image, wherein the placement of the presented plurality of other images depends on the similarity metric for each of the plurality of other images.

4. The method according to claim 3, wherein the plurality of other images that have a higher ranking within the ranked order are presented larger than images with a lower ranking.

5. The method according to claim 3, wherein the greater the level of similarity between the first image and each of the plurality of other images, the closer each of the plurality of images is to the first image.

6. One or more memory devices storing computer-executable instructions for performing a method for presenting similar images of a selected image in a user interface, the method comprising:

identifying a first selected image;

identifying a first set of one or more keypoints in the first image;

identifying a plurality of sets of one or more keypoints in a plurality of other images;

determining a plurality of similarity metrics between the first set and each of the plurality of sets of keypoints, wherein the similarity metrics are a level of similarity between the first image and the plurality of other images;

ranking the plurality of other images based on the similarity metrics, wherein the similarity metrics are distances as measured by points of differences between the first image and the plurality of other images, the distances being determined using a distance algorithm that examines the keypoints that the first image and each of the plurality of other images have in common and the distance algorithm determines the similarity metrics for each of the plurality of other images by subtracting twice the number of keypoints that the first image and a compared image of the plurality of other images have in common from the total number of keypoints found in the first image and the compared image; and presenting the plurality of other images in the ranked order around the first image.

7. The memory devices according to claim 6, wherein the similarity metrics are at least one of an Euclidian distance between a camera location for the first image and each of the plurality of other images, an angular separation between vectors corresponding to the directions in which the first image and each of the plurality of other images were photographed, and the difference between the focal lengths of the first image and each of the plurality of other images, and any combination of these techniques.

8. The memory devices according to claim 6, further comprising presenting the plurality of other images in a ranked order in at least one of concentric bands and a spiral of images around the first image, wherein the placement of the presented plurality of other images depends on the similarity metric for each of the plurality of other images.

9. The memory devices according to claim 8, wherein the plurality of other images that have a higher ranking within the ranked order are presented larger than images with a lower ranking.

10. The memory devices according to claim 8, wherein the greater the level of similarity between the first image and each of the plurality of other images, the closer each of the plurality of images is to the first image.

11. An image configuration device that executes a method for presenting similar images of a selected image in a user interface, the image configuration device comprising:

keypoint detector configured to identity a first set of one or more keypoints in a first image and a plurality of sets of one or more keypoint in a plurality of other images;

keypoint analyzer configured to determine a plurality of similarity metrics between the first set and each of the plurality of sets of keypoints, wherein the similarity metrics are a level of similarity between the first image and the plurality of other images, wherein the similarity metrics are distances as measured by points of differences between the first image and the plurality of other images, the distances being determined using a distance algorithm that examines the keypoints that the first image and each of the plurality of other images have in common and the distance algorithm determines the similarity metrics for each of the plurality of other images by subtracting twice the number of keypoints that the first image and a compared image of the plurality of other images have in common from the total number of keypoints found in the first image and the compared image; and user interface configured to rank the plurality of other images based on the similarity metrics and present the plurality of other images in the ranked order around the first image.

12. The method according to claim 11, wherein the similarity metrics are at least one of an Euclidian distance between a camera location for the first image and each of the plurality of other images, an angular separation between vectors corresponding to the directions in which the first image and each of the plurality of other images were photographed, and the difference between the focal lengths of the first image and each of the plurality of other images, and any combination of these techniques.

13. The method according to claim 11, further comprising presenting the plurality of other images in a ranked order in at least one of concentric bands and a spiral of images around the first image, wherein the placement of the presented plurality of other images depends the similarity metric for each of the plurality of other images.

14. The method according to claim 13, wherein the plurality of other images that have a higher ranking within the ranked order are presented larger than images with a lower ranking and the greater the level of similarity between the first image and each of the plurality of other images, the closer each of the plurality of images is to the first image.

* * * * *